(12) United States Patent
Tokuda

(10) Patent No.: US 11,555,898 B2
(45) Date of Patent: Jan. 17, 2023

(54) DISTANCE MEASURING DEVICE

(71) Applicant: Topcon Corporation, Tokyo (JP)

(72) Inventor: Yoshikatsu Tokuda, Tokyo (JP)

(73) Assignee: Topcon Corporation, Tokyo (JP)

( * ) Notice: Subject to any disclaimer, the term of this patent is extended or adjusted under 35 U.S.C. 154(b) by 398 days.

(21) Appl. No.: 16/798,250

(22) Filed: Feb. 21, 2020

(65) Prior Publication Data

US 2020/0271762 A1 Aug. 27, 2020

(30) Foreign Application Priority Data

Feb. 25, 2019 (JP) .............................. JP2019-031897

(51) Int. Cl.
*G01S 7/4861* (2020.01)
*G01S 13/10* (2006.01)

(52) U.S. Cl.
CPC ............ *G01S 7/4861* (2013.01); *G01S 13/10* (2013.01)

(58) Field of Classification Search
CPC ................. G06F 3/067; G06F 13/1657; G06F 15/17331; G06F 2212/254; G06F 2212/2542
See application file for complete search history.

(56) References Cited

U.S. PATENT DOCUMENTS

| 5,619,317 | A | * | 4/1997 | Oishi ................... G01S 7/4865 356/5.07 |
| 10,101,441 | B2 | | 10/2018 | Ohtomo et al. |
| 2008/0186180 | A1 | * | 8/2008 | Butler .................... H04L 67/12 340/572.1 |
| 2009/0018443 | A1 | * | 1/2009 | Colby ..................... A61B 8/00 600/437 |
| 2016/0259039 | A1 | | 9/2016 | Ohtomo et al. |

FOREIGN PATENT DOCUMENTS

JP 2016-161411 A 9/2016

* cited by examiner

*Primary Examiner* — Omeed Alizada
(74) *Attorney, Agent, or Firm* — Chiesa Shahinian & Giantomasi PC

(57) ABSTRACT

Provided is a distance measuring device which allows the measurement accuracy to be improved while the memory size is reduced. A distance measuring device includes a light emitting element which emits range-finding light as pulse light, a light receiving element which receives reflected range-finding light obtained as the range-finding light is reflected on a measurement object, an AD converter which converts the light reception signal output from the light receiving element from an analogue signal to a digital signal, multiple memories which have different memory sizes from each other and store sampled data output from the AD converter, and a rough distance calculator which calculates a distance on the basis of the sampled data stored in the multiple memories.

7 Claims, 13 Drawing Sheets

DISTANCE MEASURING DEVICE

CROSS-REFERENCE TO RELATED APPLICATIONS

This application is based upon and claims benefit of priority from Japanese Patent Application No. 2019-031897, filed Feb. 25, 2019, the disclosure of which is incorporated herein by reference in its entirety.

TECHNICAL FIELD

The present invention relates to a distance measuring device which irradiates a measurement object with pulse light and measures the distance to the measurement object on the basis of time for the pulse light to make a round trip.

BACKGROUND

Japanese Patent Application Publication No. 2016-161411 discloses an electronic distance meter which has range-finding light emitted from a light emitting element as pulse light using a pulsed signal produced by pulsing a signal with a prescribed frequency, receives, by a light receiving element, reflected range-finding light as the reflection of the range-finding light which is emitted on the measurement object, and measures a distance to the measurement object on the basis of a light reception signal output from the light receiving element. The electronic distance meter disclosed in Japanese Patent Application Publication No. 2016-161411 measures a long distance on the basis of the round trip time of the pulse light (a time delay) (TOF: Time of Flight).

The distance measuring device based on the TOF (Time of Flight) principle such as the electronic distance meter disclosed in Japanese Patent Application Publication No. 2016-161411, for example, typically samples the waveform of pulse light reflected back by the measurement object by an AD converter and stores the sampled data output from the AD converter in a memory. The AD converter starts sampling simultaneously with the light emission by the light emitting element and ends sampling after a period of time equivalent or more than the maximum measurement distance set as a specification of the distance measuring device. Therefore, in order to store all the sampled data output from the AD converter in the memory, the memory size must be larger than the value obtained by dividing the maximum measurement distance by the sampling interval (in terms of distance). The sampling interval is a value obtained by converting the sampling rate (Hz) into a distance using the velocity ($3 \times 10^8$ m/s) of the range-finding light (the pulse light).

There has been a demand for improvement in the measurement accuracy (distance calculation accuracy) in the distance measuring device which measures the distance to a measurement object using a pulse signal. For example, the sampling interval may be reduced or the width of the pulse light (pulse width) may be reduced in order to improve the distance calculation accuracy. When the sampling interval is small, the shape of the waveform of returned pulse light reflected on a measurement object can be stored in more detail. As a result, the distance calculation accuracy may be improved. However, when the sampling interval is reduced, a larger memory size is required.

When the pulse width is reduced, the range of pulse fluctuations is reduced. Therefore, the distance calculation accuracy is improved. In recent years, it has become possible to generate pulse light with a pulse width for example of one nanosecond or less. However, as the pulse width is reduced, a greater memory size is necessary.

SUMMARY

The present invention is directed to a solution to the problem, and it is an object of the present invention to provide a distance measuring device which allows the measurement accuracy to be improved while the memory size is reduced.

According to the present invention, the object is achieved by a distance measuring device which irradiates a measurement object with range-finding light as pulse light and measures a distance to the measurement object on the basis of time required for the pulse light to make a round trip, and the device includes a light emitting element which emits the range-finding light as the pulse light, a light receiving element which receives reflected range-finding light obtained as the range-finding light is reflected on the measurement object and outputs a light reception signal corresponding to the reflected range-finding light, an AD converter which converts the light reception signal output from the light receiving element from an analog signal to a digital signal, multiple memories which have different memory sizes from one another and store sampled data output from the AD converter, and a distance calculator which calculates the distance on the basis of the sampled data stored in the multiple memories.

In the distance measuring device according to the present invention, the AD converter converts a light reception signal output from the light receiving element from an analogue signal to a digital signal and outputs sampled data and has the sampled data stored in the multiple memories. The multiple memories have different memory sizes from one another. The distance calculator calculates a distance on the basis of the sampled data stored in the multiple memories. Here, since the multiple memories have different memory sizes from one another and the sampled data is stored in the multiple memories, so that the distance calculator can calculate the distance to the measurement object on the basis of the address in the memory at which pulse data on the light reception signal is stored. Therefore, the memories do not have to have a memory size necessary for storing the sampled data for the maximum measurement distance. For example, the memory sizes of the memories may be smaller than the memory size necessary for storing the sampled data for the maximum measurement distance. More sampled data pieces may be stored in the multiple memories having a smaller memory size by reducing the sampling interval or the optical width (pulse width). In this way, the measurement accuracy can be improved while the memory size is reduced.

In the distance measuring device according to the invention, each of the multiple memories preferably has a memory size smaller than a memory size necessary for storing the sampled data for the maximum measurement distance.

In the distance measuring device according to the present invention, the memories each have a memory size smaller than a memory size necessary for storing the sampled data for the maximum measurement distance. More sampled data pieces may be stored in the multiple memories having a smaller memory size by reducing the sampling interval or the pulse width. In this way, the measurement accuracy can be improved more surely while the memory size is reduced. Since the memories each have a smaller size than a memory size necessary for storing the sampled data for the maximum measurement distance, the distance measuring device may operate with smaller power consumption and have its size and heat radiation reduced.

The distance measuring device according to the present invention further preferably includes a controller which executes such control that the multiple memories simultaneously store the same sampled data each sequentially from the first address to the last address, and then perform overwriting with the sampled data back from the first address, and during the overwriting, the sampled data already stored in the memory and the sampled data to be newly stored in the memory are added.

In the distance measuring device according to the present invention, even when the memories do not have a memory size necessary for storing the sampled data for the maximum measurement distance, the controller has the same sampled data simultaneously stored in the multiple memories each sequentially from the first address to the last address, and then performs overwriting with the sampled data back from the first address. During the overwriting, the controller performs such control that the sampled data already stored in the memory and the sampled data to be newly stored in the memory are added. Therefore, every time the first address of the first memory is again overwritten with sampled data, the sampled data to be newly stored at the addresses of the first memory is added up to the sampled data already stored at the addresses of the first memory. The distance calculator calculates the distance to the measurement object on the basis of the sampled data added up to the addresses in the memories until at least a time period corresponding to the maximum measurement distance elapses. Therefore, even when the memories do not have a memory size necessary for storing the sampled data for the maximum measurement distance, the distance calculator can calculate a longer distance to a measurement object with a higher accuracy on the basis of the address in the memory at which the pulse data on the light reception signal is stored. In this way, the measurement accuracy and the maximum measurement distance can be improved while the memory size is reduced.

In the distance measuring device according to the present invention, the controller preferably divides each of the multiple memories into blocks having a prescribed size, specifies the address at which pulse data on the light reception signal is stored on the basis of a combination of the blocks in the multiple memories in which the pulse data on the light reception signal is stored, and the distance calculator calculates the distance on the basis of the address at which the pulse data on the light reception signal is stored.

In the distance measuring device according to the present invention, the address in the memory at which the pulse data on the light reception signal is specified on the basis of a combination of blocks in the memories in which the pulse data on the light reception signal is stored. Therefore, even when the memories do not have a memory size necessary for storing the sampled data for the maximum measurement distance, the controller can specify the address in the memory at which the pulse data on the light reception signal is stored. The distance calculator calculates a distance on the basis of the address of the memory at which the pulse data on the light reception signal is stored. In this way, the measurement accuracy can be improved more reliably while the memory size is reduced.

In the distance measuring device according to the present invention, the controller preferably has the memory store a value obtained by subtracting a DC component from the sampled data output from the AD converter.

In the distance measuring device according to the present invention, a value obtained by subtracting a DC component from the sampled data output from the AD converter is stored in the memory. Therefore, when the controller performs such control that the sampled data already stored in the memory and the sampled data to be newly stored in the memory are added, the memory can be prevented from being saturated due to increase in the addition result. In this way, the measurement accuracy can be improved while the memory size is even more reduced.

According to the present invention, a distance measuring device which allows the memory size to be kept small and the measurement accuracy to be improved can be provided.

DETAILED DESCRIPTION

Figure 1:
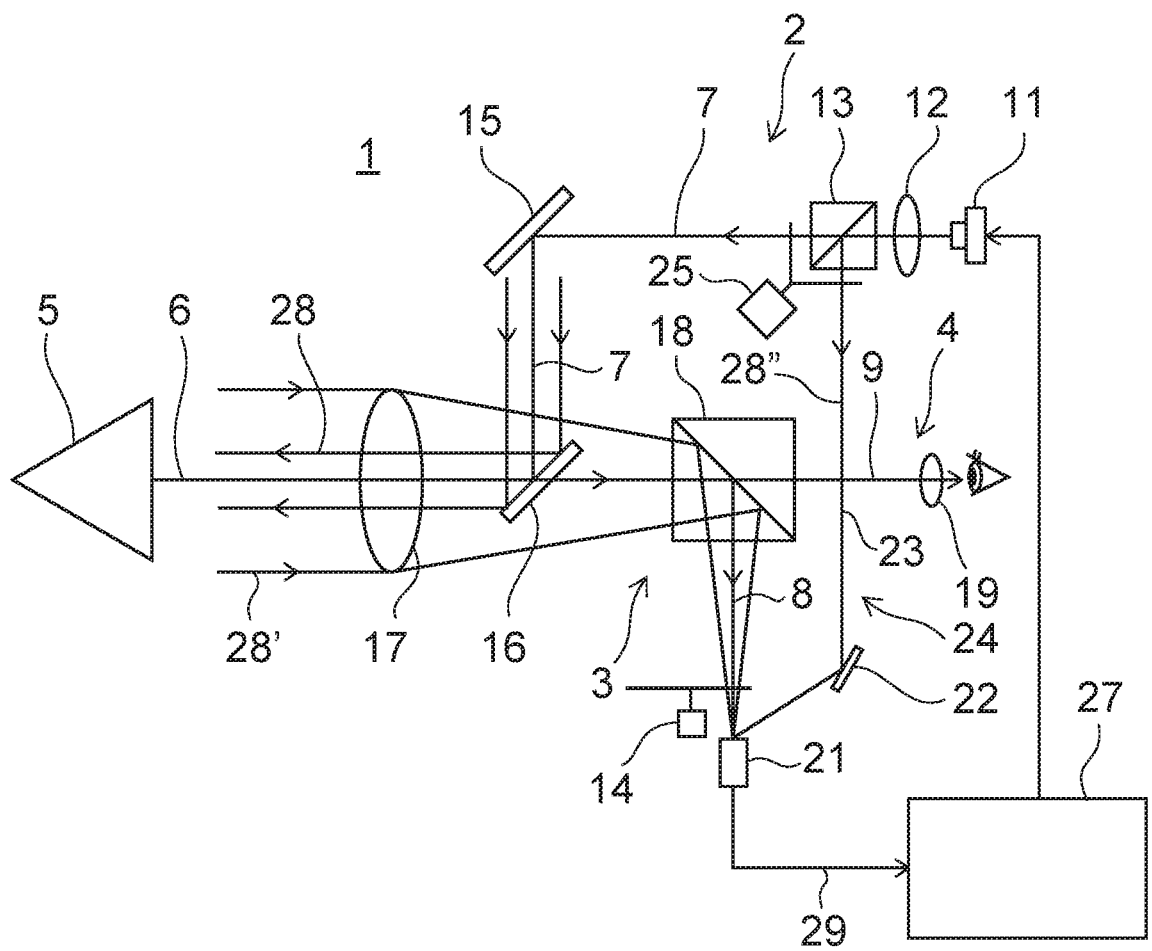
FIG. 1 is a schematic view of a range-finding optical system in a distance measuring device according to an embodiment of the present invention.

Hereinafter, a preferred embodiment of the present invention will be described in detail in conjunction with the accompanying drawings. Note that the following embodiment is a specific preferred example of the present invention and includes various technically preferable limitations, while the described features are not intended to limit the scope of the present invention unless otherwise specified in the following description. In the drawings, the same elements are designated by the same reference characters and their descriptions may not be repeated as appropriate.

FIG. 1 is a schematic view of a range-finding optical system in a distance measuring device according to an embodiment of the present invention. As shown in FIG. 1, the range-finding optical system 1 includes an emitting optical system 2, a light receiving optical system 3, and a collimating optical system 4. In FIG. 1, a prism as a retroreflector is shown as a measurement object 5 for ease of illustration. However, the measurement object 5 is not limited to the prism. The range-finding optical system 1 shown in FIG. 1 is an exemplary range-finding optical system in the distance measuring device according to the embodiment. In other words, the range-finding optical system in the distance measuring device according to the embodiment is not limited to the range-finding optical system 1 shown in FIG. 1.

The range-finding optical system 1 has a range-finding optical axis 6 directed to the measurement object 5. The emitting optical system 2 has an emission optical axis 7. The light receiving optical system 3 includes a light receiving optical axis 8. The collimating optical system 4 has a collimation optical axis 9. A light emitting element 11, a condenser lens 12, a half mirror 13, and deflecting mirrors 15 and 16 are provided on the emission optical axis 7. The range-finding light passing through the emission optical axis 7 is deflected by the deflecting mirrors 15 and 16 and matches the range-finding optical axis 6. The light emitting element 11 such as a laser diode, a pulse laser diode, and a pulsed fiber laser emits range-finding light on the basis of a pulsed signal (pulse signal) as pulse light. The waveform of the pulse signal is not particularly limited, and the signal may have a rectangular waveform or a triangular waveform.

An objective lens 17 and a dichroic mirror 18 are provided on the range-finding optical axis 6. The dichroic mirror 18 transmits visible light and reflects range-finding light. The part of the range-finding optical axis 6 transmitted through the dichroic mirror 18 corresponds to the collimation optical axis 9. An eyepiece 19 is provided on the collimation optical axis 9.

The objective lens 17, the dichroic mirror 18, the eyepiece 19, and the like form the collimating optical system 4. The condenser lens 12, the half mirror 13, the deflecting mirror 15 and 16, the objective lens 17, and the like form the emitting optical system 2.

The part of the range-finding optical axis 6 reflected on the dichroic mirror 18 corresponds to the light receiving optical axis 8. A light quantity regulator 14 and a light receiving element 21 are provided on the light receiving optical axis 8. For example, a photodiode or an avalanche photodiode (APD) is used as the light receiving element 21. The objective lens 17, the dichroic mirror 18, the light quantity regulator 14, and the like form the light receiving optical system 3.

The reflection optical axis of the half mirror 13 is guided, as an internal reference optical axis 23, to the light receiving element 21 through a reflecting mirror 22. The half mirror 13 and the reflecting mirror 22 form an internal reference optical system 24. The light emitting element 11 and the light receiving element 21 are each electrically connected to the arithmetic processing unit 27.

An optical path switching unit 25 is provided at the emission optical axis 7 and an internal reference optical axis 23. The optical path switching unit 25 selectively shuts off or opens the emission optical axis 7 and the internal reference optical axis 23. The optical path switching unit 25 switches between the state in which the range-finding light transmitted through the half mirror 13 is emitted toward the measurement object 5 and the state in which that the range-finding light reflected on the half mirror 13 is partly emitted toward the internal reference optical system 24.

Now, the function of the range-finding optical system 1 will be described. Range-finding light 28 emitted from the light emitting element 11 as pulse light and formed into a parallel beam by the condenser lens 12 is transmitted through the center of the objective lens 17 and emitted upon the measurement object 5.

The range-finding light reflected on the measurement object 5 enters the objective lens 17 as reflected range-finding light 28', is collected by the objective lens 17, and reflected on the dichroic mirror 18, and has its light quantity regulated by the light quantity regulator 14, and then the light enters the light receiving element 21. The light receiving element 21 outputs a light reception signal 29 corresponding to the received reflected range-finding light 28'.

A part of the range-finding light 28 (internal reference light 28") emitted from the light emitting element 11 is reflected on the half mirror 13. When the optical path switching unit 25 switches the optical path and the internal reference optical axis 23 is opened, the internal reference light 28" enters the light receiving element 21 through the internal reference optical system 24. The light receiving element 21 outputs a light reception signal corresponding to the received internal reference light 28". Upon receiving the reflected range-finding light 28', the light receiving element 21 carries out the same processing as when the light receiving element 21 receives the internal reference light 28". Therefore, how the light reception signal corresponding to the reflected range-finding light 28' is processed will be described by way of illustration.

Visible light entering through the objective lens 17 is transmitted through the dichroic mirror 18 and collected by the eyepiece 19. A surveyor can collimate the measurement object 5 by the visible light entering through the eyepiece 19.

Figure 2:
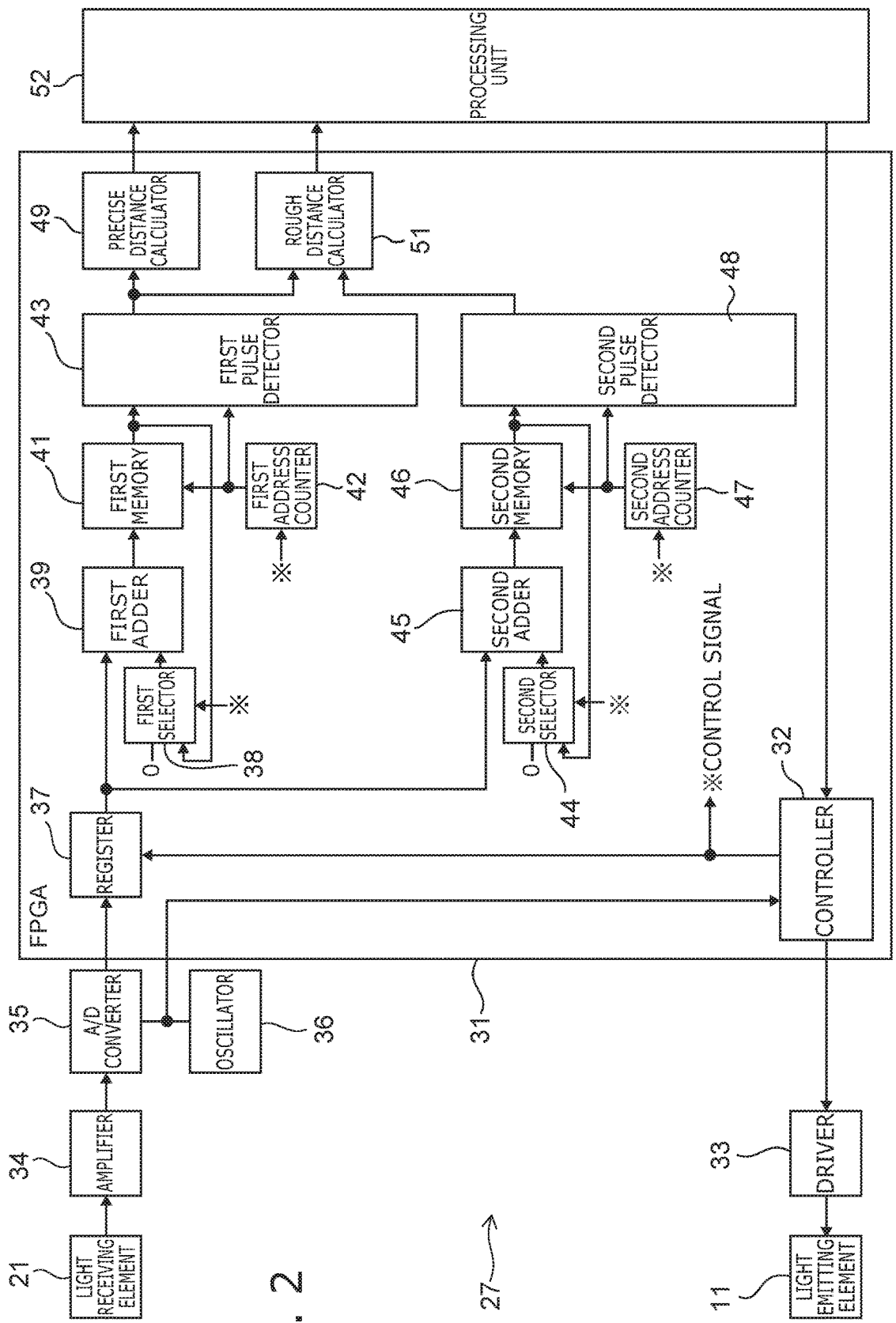
FIG. 2 is a schematic diagram of an arithmetic processing unit in the distance measuring device according to the embodiment.
Figure 3:
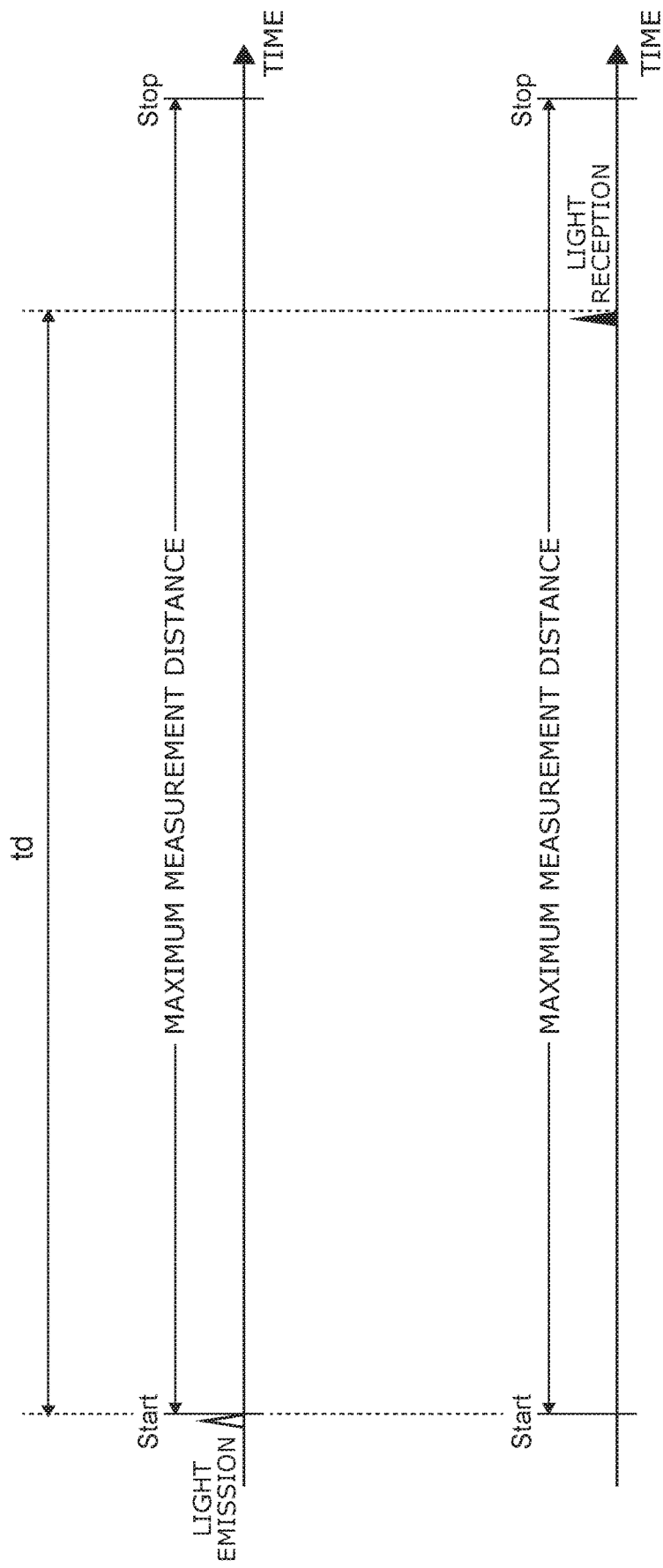
FIG. 3 is a timing chart for illustrating a light emission signal and a light reception signal in the distance measuring device according to the embodiment.

Now, the arithmetic processing unit 27 in the distance measuring device according to the embodiment will be described. FIG. 2 is a schematic diagram of the arithmetic processing unit in the distance measuring device according to the embodiment. FIG. 3 is a timing chart for illustrating a light emission signal and a light reception signal in the distance measuring device according to the embodiment. Note that the upper timing chart in FIG. 3 shows the generation timing for the pulse signal (the light emission signal) output from the driver 33. In other words, the upper timing chart in FIG. 3 shows the emission timing for the light emission signal output from the light emitting element 11. The lower timing chart in FIG. 3 shows the generation timing for the light reception signal output from the light receiving element 21.

The arithmetic processing unit 27 according to the embodiment includes a field programmable gate array (FPGA) 31, the driver 33, an amplifier 34, an AD converter 35, an oscillator 36, and a processing unit 52. The processing unit 52 may be for example a central processing unit (CPU) or a digital signal processor (DSP).

The FPGA 31 includes a controller 32, a register 37, a first selector 38, a first adder 39, a first memory 41, a first address counter 42, a first pulse detector 43, a second selector 44, a second adder 45, a second memory 46, a second address counter 47, a second pulse detector 48, a precise distance calculator 49, and a rough distance calculator 51. Note that the FPGA 31 may be a known microcomputer. The rough distance calculator 51 according to the embodiment is an example of the "distance calculator" according to the present invention.

As shown in FIG. 2, the FPGA 31 according to the embodiment has multiple memories. The number of memories is not limited to two and may be three or more. In the description of the embodiment, the FPGA 31 has two memories (a first memory 41 and a second memory 46) for ease of illustration. The memory size of the first memory 41 is different from the memory size of the second memory 46. In other words, the first memory 41 and the second memory 46 have different memory sizes from each other. The memory size of each of the first memory 41 and second memory 46 may be smaller than the memory size required to store sampled data for the maximum measurement distance set as a specification of the distance measuring device according to the embodiment.

The controller 32 outputs, to the driver 33, a pulse signal having a prescribed frequency on the basis of a signal output from the AD converter 35 and the oscillator 36. The oscillator 36 may be a temperature compensated crystal oscillator (TCXO). The driver 33 drives the light emitting element 11 on the basis of the pulse signal output from the controller 32, so that the range-finding light 28 is emitted as pulse light at prescribed time intervals.

The light emitting element 11 emits the range-finding light 28 as pulse light at prescribed time intervals on the basis of the pulse signal (light emission signal) output from the driver 33, as in the upper timing chart shown in FIG. 3. The light emitting element 11 emits the range-finding light 28 at prescribed time intervals until at least a time period corresponding to the maximum measurement distance elapses and ends emitting of the range-finding light 28 after at least the time period corresponding to the maximum measurement distance elapses. For ease of illustration, FIG. 3 shows only the generation timing for the pulse signal output from the driver 33 for the first time after the start of the light emission.

The range-finding light 28 reflected on the measurement object 5 (i.e., the reflected range-finding light 28') enters the light receiving element 21 as pulse light. The light receiving element 21 outputs a light reception signal 29 corresponding to the received reflected range-finding light 28'. Therefore, as in the lower timing chart in FIG. 3, the light reception signal 29 from the light receiving element 21 is a pulse output. For ease of illustration, FIG. 3 shows only the generation timing for the light reception signal 29 output from the light receiving element 21 for the first time after the start of the light emission. As shown in FIG. 3, a time delay td corresponding to the direct distance between the distance measuring device and the measurement object 5 is generated between the light reception signal and the light emission signal.

The light reception signal 29 output from the light receiving element 21 is amplified by the amplifier 34. The signal amplified by the amplifier 34 is input to the AD converter 35. The AD converter 35 converts the light reception signal output from the light receiving element 21 and amplified by the amplifier 34 from an analog signal into a digital signal and outputs the resultant signal as sampled data. The sampling by the AD converter 35 starts simultaneously with light emission by the light emitting element 11 and ends after at least a time period corresponding to the maximum measurement distance elapses.

The sampled data output from the AD converter is stored in the first memory 41 through the register 37 and the first adder 39 and in the second memory 46 through the register 37 and the second adder 45. More specifically, the first memory 41 and the second memory 46 each store the sampled data output from the AD converter. At the time, the first memory 41 and the second memory 46 simultaneously store the same sampled data.

The register 37 functions for example as a latch circuit and holds prescribed information. The register 37 is a flip-flop which latches digital data as sampled data output from the AD converter, so that it is ensured that data entered at high speed can be captured. The controller 32 may control the register 37 and input the value obtained by subtracting the DC component from the sampled data output from the AD converter 35 to the first adder 39 and the second adder 45. In this case, the value obtained by subtracting the DC component from the sampled data output from the AD converter 35 is stored in each of the first memory 41 and the second memory 46.

The first adder 39 adds sampled data already stored in the first memory 41 and sampled data to be newly stored in the first memory 41. Herein, the "sampled data to be newly stored" corresponds to the sampled data output from the AD converter. More specifically, when the sampled data is stored in the first memory 41 from the first address to the last address of the memory 41, the first selector 38 outputs "0" in response to a control signal transmitted from the controller 32. Meanwhile, when the sampled data is stored in the first memory 41 from the first address to the last address of the first memory 41 and overwriting is performed back to the first address, the first selector 38 outputs the sampled data already stored in the first memory 41 in response to a control signal transmitted from the controller 32. Therefore, every time the first address of the first memory 41 is again overwritten with sampled data, the sampled data to be newly stored at the addresses of the first memory 41 is added to the sampled data already stored at the addresses of the first memory 41.

Herein, the wording "stored for the first time" refers to storing for the first time in the step of measuring the distance to any arbitrary measurement object 5 and does not indicate that the storing occurs for the first time since the distance measuring device according to the embodiment starts to be used.

The second adder 45 adds sampled data already stored in the second memory 46 and sampled data to be newly stored in the second memory 46. More specifically, when the sampled data is stored for the first time from the first address to the last address of the second memory 46, the second selector 44 outputs "0" in response to a control signal transmitted from the controller 32. Meanwhile, when the sampled data is stored from the first address to the last address of the second memory 46 and the first address is again overwritten, the second selector 44 outputs the sampled data already stored in the second memory 46 in response to a control signal transmitted from the controller 32. Therefore, every time the second memory 46 is overwritten with sampled data again from the first address, the sampled data to be newly stored at the addresses of the second memory 46 is added up to the sampled data already stored at the addresses of the second memory 46.

The first address counter 42 calculates the addresses of the first memory 41 in response to a control signal transmitted from the controller 32 and outputs the calculation result to the first memory 41 and the first pulse detector 43. The second address counter 47 calculates the addresses of the second memory 46 in response to a control signal transmitted from the controller 32 and outputs the calculation result to the second memory 46 and the second pulse detector 48.

The first pulse detector 43 detects pulse data on a light reception signal on the basis of sampled data stored in the first memory 41 and outputs the detected data to the precise distance calculator 49 and the rough distance calculator 51. The second pulse detector 48 detects pulse data on the light reception signal on the basis of sampled data stored in the second memory 46 and outputs the detected data to the rough distance calculator 51.

The rough distance calculator 51 calculates a rough distance to the measurement object 5 on the basis of the pulse data on the light reception signal output from the first pulse detector 43 and the second pulse detector 48. More specifically, the rough distance calculator 51 calculates a rough distance to the measurement object 5 on the basis of the sampled data stored in the first memory 41 and the second memory 46. Specifically, the rough distance calculator 51 calculates the distance between the distance measuring device and the measurement object 5 on the basis of the time delay td shown in FIG. 3 (TOF: Time of Flight). At the time, the rough distance calculator 51 subtracts the calculated rough distance calculated from the light reception signal of the internal reference light 28" from the rough distance calculated from the light reception signal of the reflected range-finding light 28'. In this way, the rough distance calculator 51 can eliminate the influence of temperature drift or the like by the arithmetic processing unit 27 as an electrical circuit by determining the difference between the rough distance calculated from the reflected range-finding light 28' and the rough distance calculated from the internal reference light 28". The rough distance calculator 51 outputs a signal related to the calculation result of the rough distance to the processing unit 52.

The precise distance calculator 49 calculates a precise distance not more than the sampling interval on the basis of pulse data on a light reception signal output from the first pulse detector 43. For example, the precise distance calculator 49 calculates the precise distance using a Fourier transform. At the time, the precise distance calculator 49 subtracts a precise distance calculated from the light reception signal of the internal reference light 28" from a precise distance calculated from the light reception signal of the reflected range-finding light 28'. As described above, the precise distance calculator 49 can eliminate the influence of temperature drift or the like by the arithmetic processing unit 27 as an electrical circuit by determining the difference between the precise distance calculated from the reflected range-finding light 28' and the precise distance calculated from the internal reference light 28". Then, the precise distance calculator 49 outputs a signal related to the calculation result of the precise distance to the processing unit 52.

The processing unit 52 performs arithmetic processing for calculating a distance value from the distance measuring device to the measurement object 5 by adding the rough distance value output from the rough distance calculator 51 and the precise distance value output from the precise distance calculator 49.

As described above, the AD converter 35 starts sampling simultaneously with the light emission by the light emitting element 11 and ends sampling when at least a time period corresponding to the maximum measurement distance elapses. Therefore, in a comparative example with only one memory for storing sampled data, the memory size must be larger than the value obtained by dividing the maximum measurement distance by the sampling interval (in terms of distance) in order to store all the sampled data output from the AD converter in the memory. The sampling interval is a value obtained by converting the sampling rate (Hz) into a distance using the velocity ($3\times10^8$ m/s) of range-finding light (pulse light). In the distance measuring device which measures the distance to a measurement object using a pulse signal, it is desirable to improve the measurement accuracy (the distance calculation accuracy) while a larger memory size is necessary to improve the distance calculation accuracy.

In contrast, the distance measuring device according to the embodiment includes multiple memories. The multiple memories have different memory sizes from one another. In the example of the arithmetic processing unit 27 shown in FIG. 2, the FPGA 31 has the two memories (the first memory 41 and the second memory 46). The first memory 41 and the second memory 46 have different memory sizes from each other. The rough distance calculator 51 then calculates a rough distance to the measurement object 5 on the basis of sampled data stored in the first memory 41 and the second memory 46.

Since the first memory 41 and the second memory 46 have different memory sizes from each other and sampled data output from the AD converter 35 is stored in the first memory 41 and the second memory 46, the rough distance calculator 51 can calculate the distance to the measurement object 5 on the basis of the addresses of the first memory 41 and the second memory 46 in which the pulse data on the light reception signal is stored. Therefore, neither of the first memory 41 and the second memory 46 has to have a memory size necessary for storing the sampled data for the maximum measurement distance. For example, the memory sizes of the first memory 41 and the second memory 46 may each be smaller than the memory size necessary for storing the sampled data for the maximum measurement distance. The sampling interval may be reduced and the width (pulse width) of the pulse light may be reduced, so that more sampled data can be stored in the first memory 41 and the second memory 46 having a smaller memory size. In this way, the measurement accuracy can be improved while the memory size is reduced.

Also, when the memory sizes of the first memory 41 and the second memory 46 are each smaller than the memory size required to store the sampled data for the maximum measurement distance, the measurement accuracy can be improved more surely while the memory size is reduced. When the memory sizes of the first memory 41 and the second memory 46 are each smaller than the memory size necessary for storing the sampled data for the maximum measurement distance, the distance measuring device can operate with smaller power consumption and have its size and heat radiation reduced.

Figure 4:
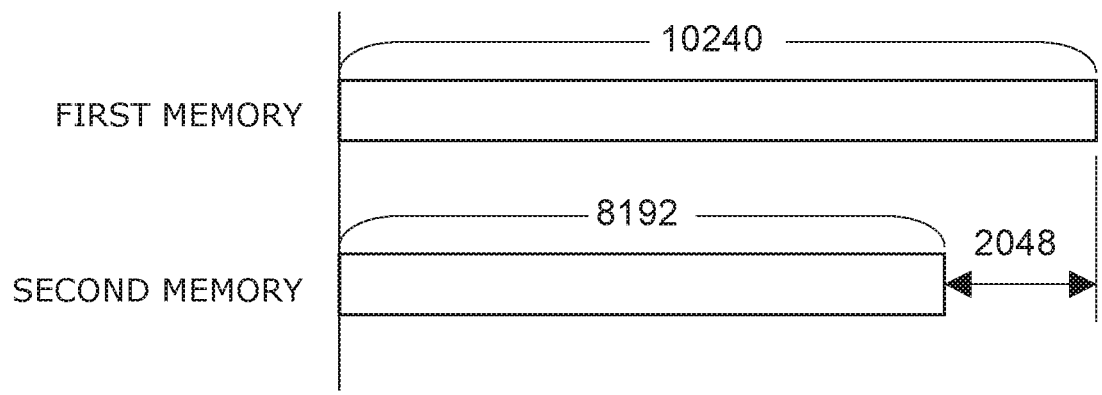
FIG. 4 is a schematic diagram for illustrating the memory sizes of memories according to the embodiment.
Figure 5:
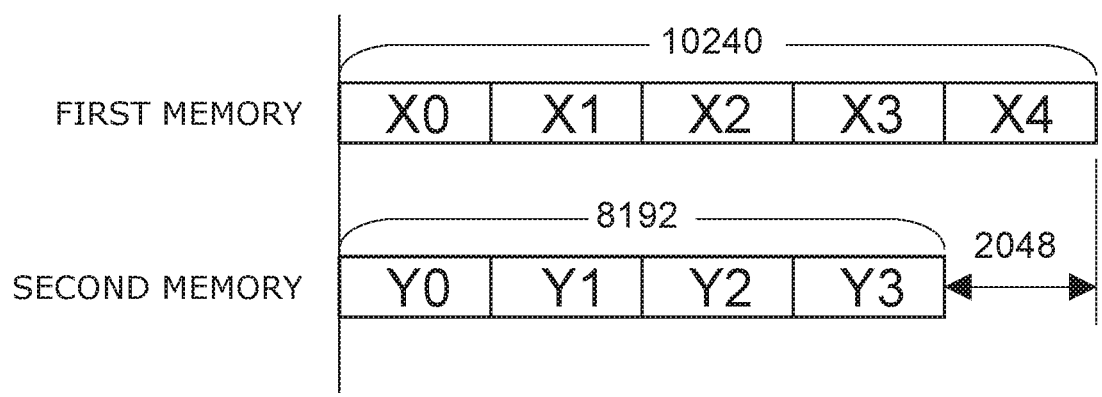
FIG. 5 is a schematic diagram for illustrating how the memories according to the embodiment are divided into blocks.
Figure 6:
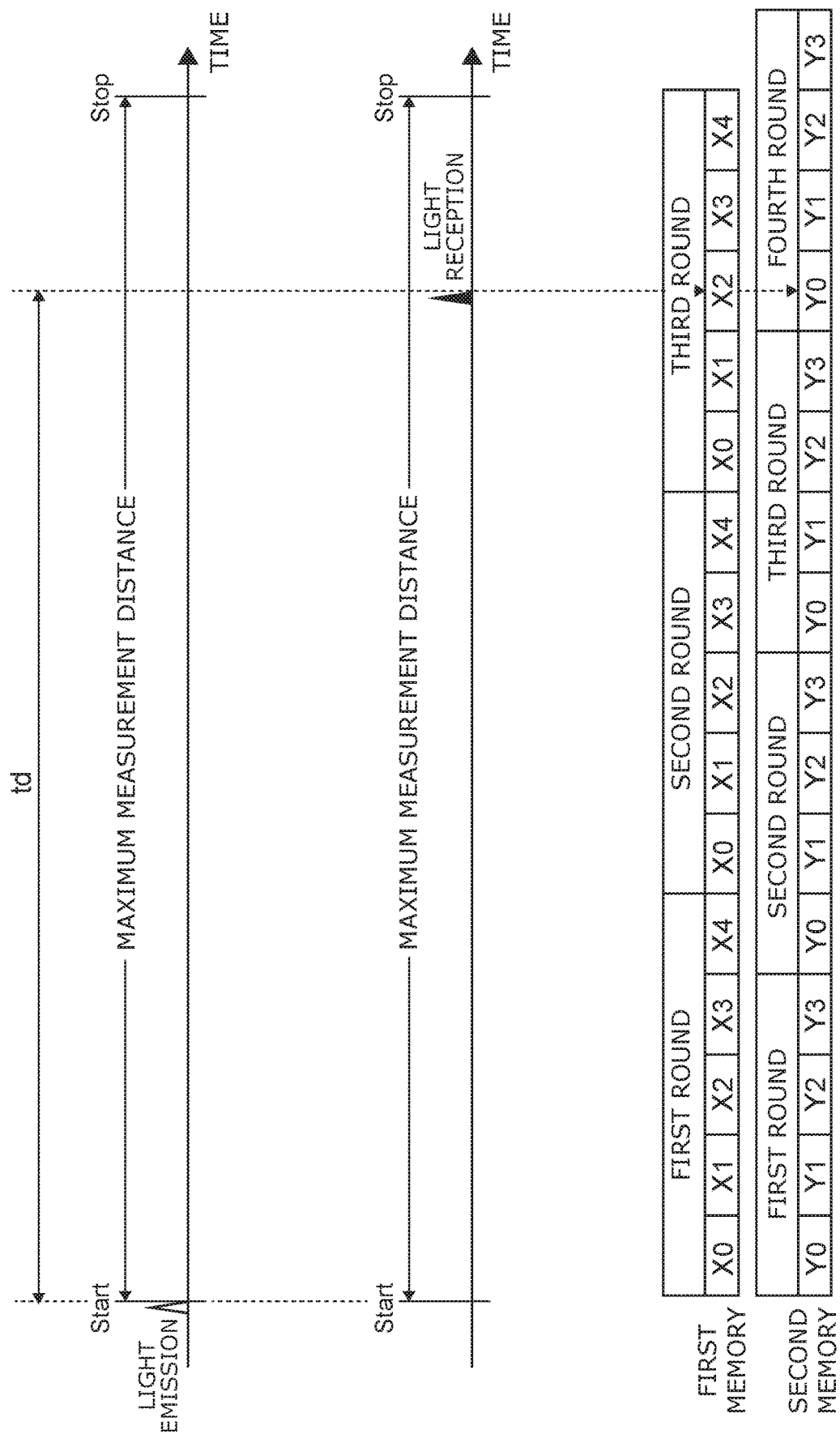
FIG. 6 schematically illustrates a relation between pulse data on a light reception signal and memory blocks.
Figure 7:
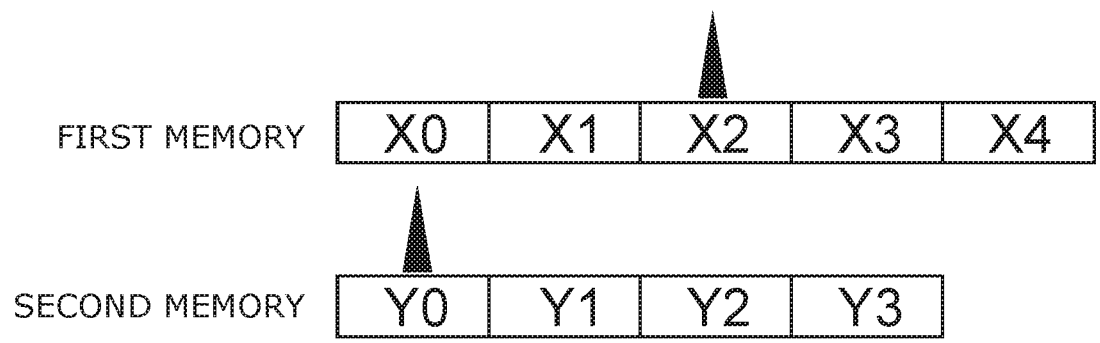
FIG. 7 is a schematic diagram illustrating a combination of memory blocks in which pulse data on a light reception signal is stored.
Figure 8:
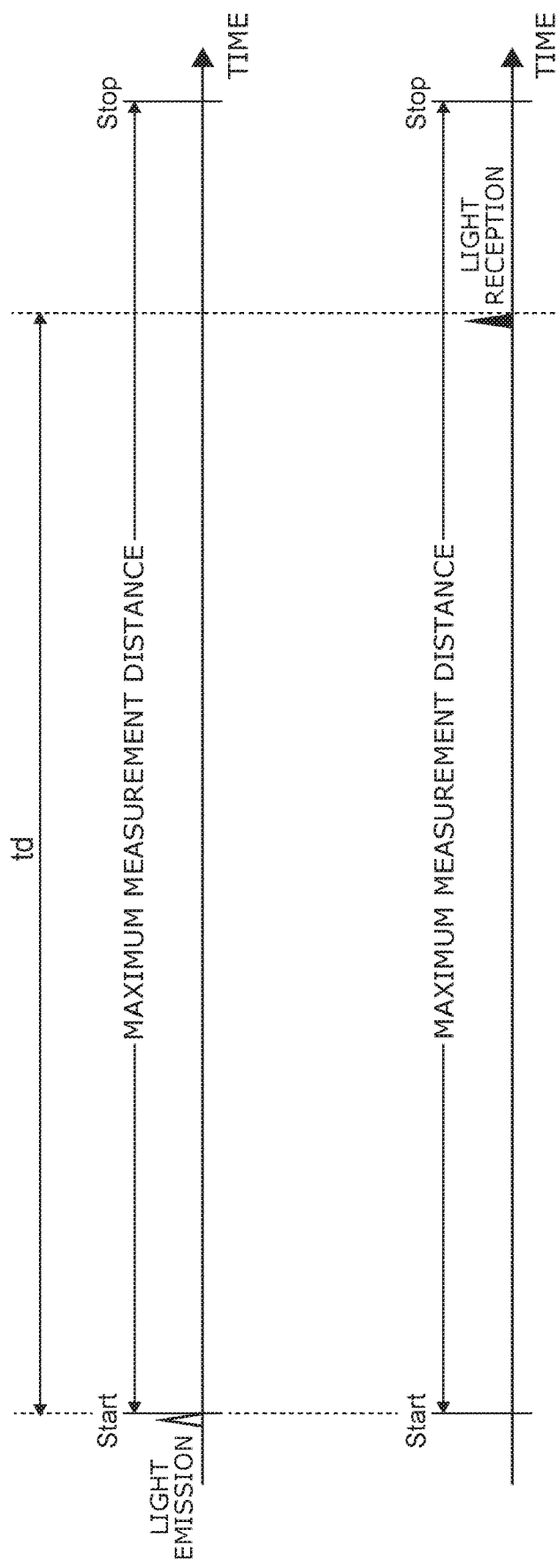
FIG. 8 schematically illustrates another relation between pulse data on a light reception signal and memory blocks.
Figure 9:
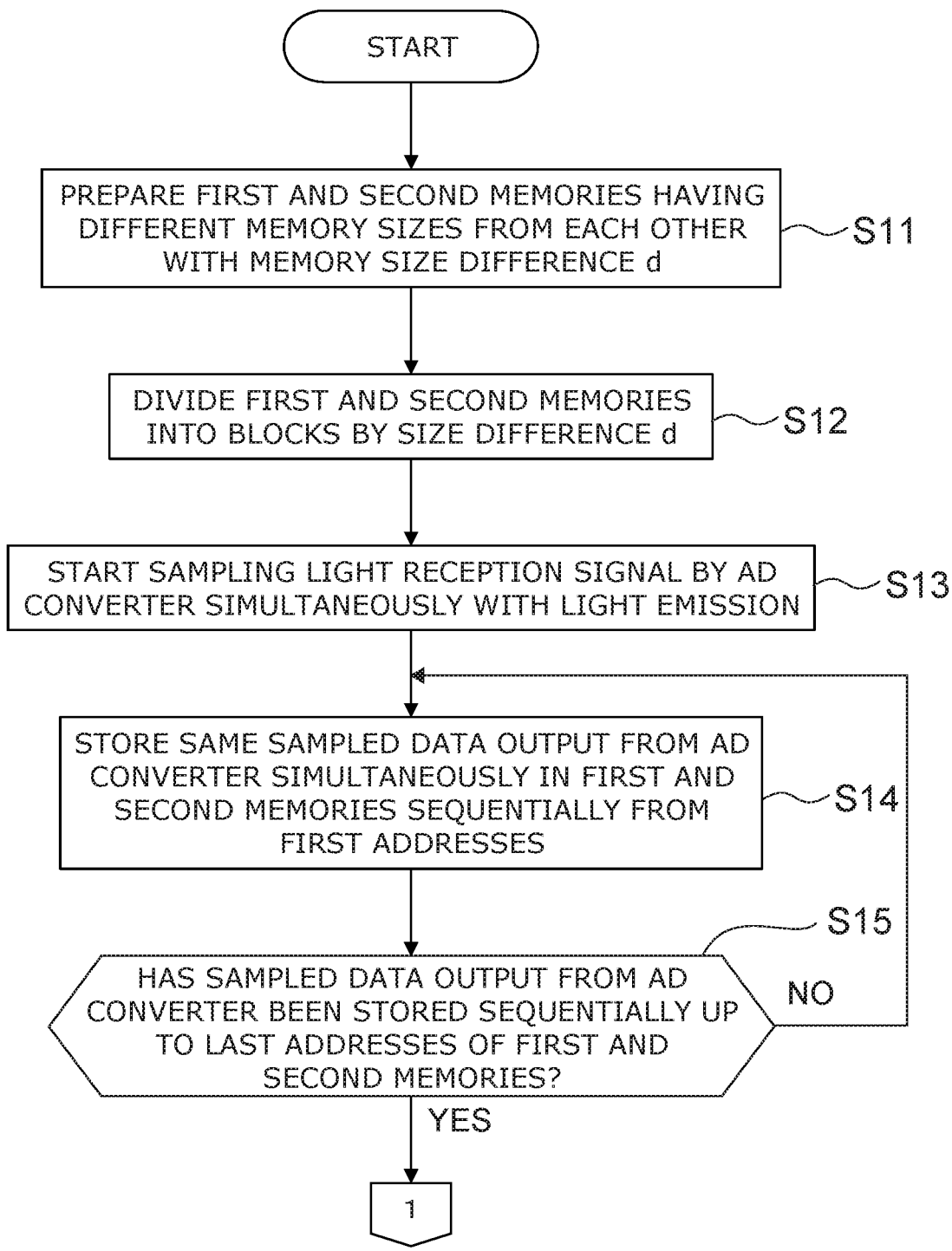
FIG. 9 is a flowchart for illustrating a specific example of how the distance measuring device according to the embodiment calculates the distance to a measurement object.
Figure 10:
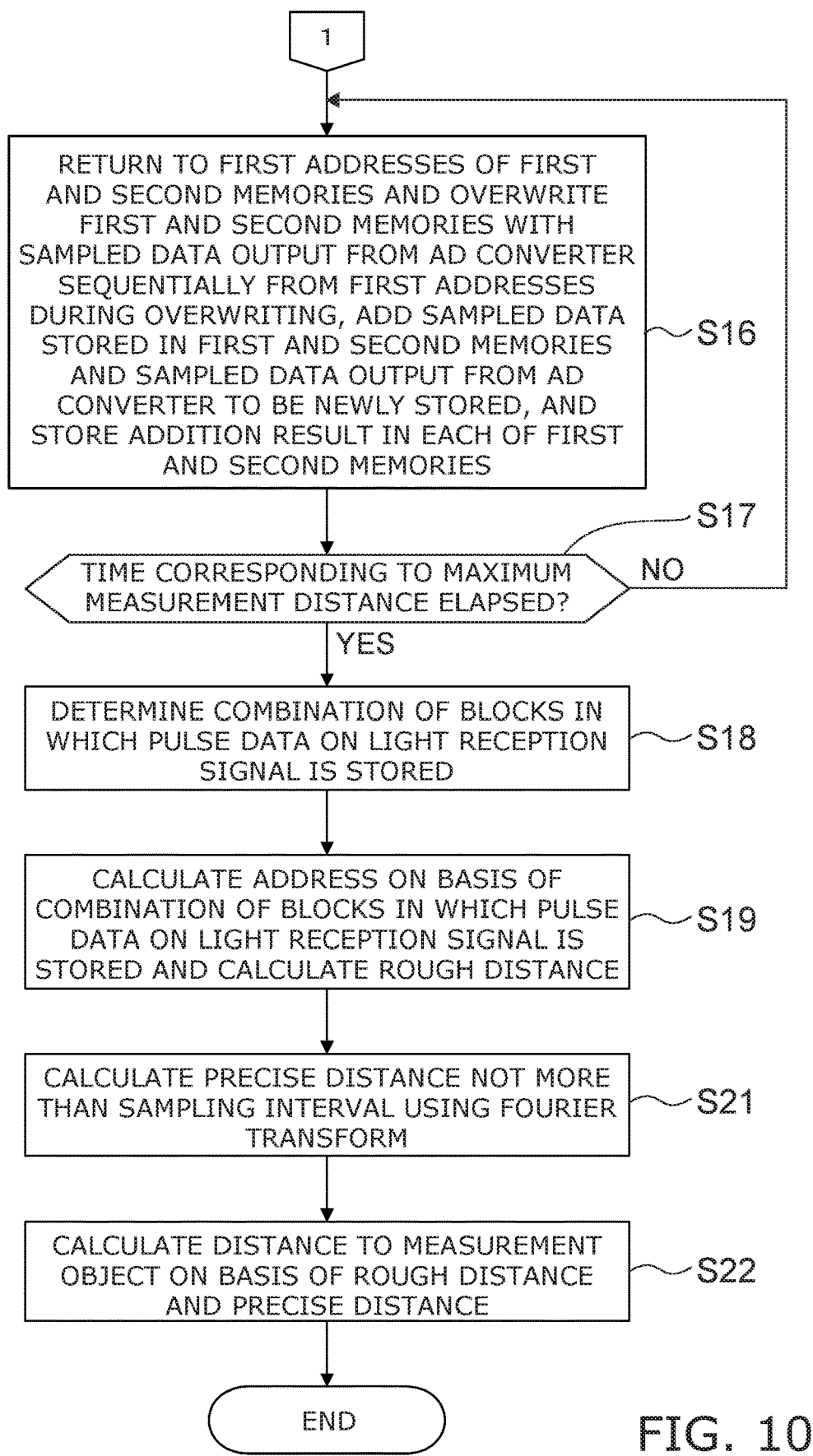
FIG. 10 is a flowchart for illustrating a specific example of how the distance measuring device according to the embodiment calculates the distance to the measurement object.

Now, a first specific example in which the distance measuring device according to the embodiment calculates the distance to a measurement object will be described with reference to the drawings. FIG. 4 is a schematic diagram illustrating the memory sizes of memories according to the embodiment. FIG. 5 is a schematic diagram illustrating how the memories according to the embodiment are divided into blocks. FIG. 6 schematically illustrates a relation between a pulse data on a light reception signal and memory blocks. FIG. 7 is a schematic diagram illustrating a combination of memory blocks in which the pulse data on the light reception signal is stored. FIG. 8 is a schematic diagram illustrating another relation between pulse data on a light reception signal and memory blocks. FIGS. 9 and 10 are flow charts for illustrating a first specific example of how the distance measuring device according to the embodiment calculates the distance to a measurement object.

The upper timing chart shown in each of FIGS. 6 and 8 corresponds to the upper timing chart shown in FIG. 3. The timing chart shown in the middle of each of FIGS. 6 and 8 corresponds to the lower timing chart shown in FIG. 3. The lower timing chart shown in each of FIGS. 6 and 8 schematically illustrates a combination of multiple block memories.

The first memory 41 and the second memory 46 having different memory sizes from each other as shown in FIG. 4 are prepared (step S11 in FIG. 9). As described above with respect to FIG. 2, the number of memories is not limited to two and may be three or more. In the description of the specific example, the two memories (the first memory 41 and the second memory 46) are provided for ease of illustration.

In the specific example, the number of addresses of the first memory 41 is 10240. The addresses of the first memory 41 are sequentially from 0 as the first address to 10239 as the last address. The number of addresses of the second memory 46 is 8192. The addresses of the second memory 46 are sequentially from 0 as the first address to 8191 as the last address. The difference between the number of addresses of the first memory 41 and the number of addresses of the second memory 46 is denoted by d (=2048) (step S11 in FIG. 9).

Note that when the quantization decomposition by the AD converter 35 is constant, the number of addresses of each memory is equivalent to the memory size of the memory. When the quantization decomposition by the AD converter 35 is constant, the address difference among the multiple memories is equivalent to the memory size difference among the multiple memories. Therefore, in the following description of the specific example, the number of addresses of each memory is considered equivalent to the memory size of the memory, and the address difference among the multiple memories is considered equivalent to the memory size difference among the multiple memories.

In the example, the number of addresses of each of the first memory 41 and the second memory 46 is an integral multiple of the address number difference d between the first memory 41 and the second memory 46. In other words, the number of addresses (10240) of the first memory 41 is equal to five times the address number difference d (2048). The number of addresses of the second memory 46 (8192) is equal to four times the address number difference d (2048). Note that the number of addresses of the first memory 41 (10240) and the number of addresses of the second memory 46 (8192) do not have to be an integer multiple of the address number difference d (2048).

Subsequently, as shown in FIG. 5, the first memory 41 and the second memory 46 are each divided into blocks on the basis of the address number difference d (step S12 in FIG. 9). In the specific example, the first memory 41 is divided into five blocks X0 to X4 because the number of addresses of the first memory 41 is five times the address number difference d. Further, since the number of addresses of the second memory 46 is four times the address number difference d, the second memory 46 is divided into four blocks Y0 to Y3.

Note that the size of each block does not have to be equal to the address number difference d. The size of each block may also be different between the first memory 41 and the second memory 46. In the following description of this specific example, the size of each block is equal to the address number difference d.

In the example, the number of addresses of each of the blocks X0 to X4 and Y0 to Y3 is equal to the address number difference d. When for example the sampling rate of the AD converter 35 is 500 MHz, the sampling interval (in terms of distance) is 300 mm. Therefore, the address number difference d (2048) in this example corresponds to a distance of 300×2048=614400 mm (614.4 m).

The addresses of the block X0 are 0 to d−1 (0 to 2047). The addresses of the block X1 are d to 2d−1 (2048 to 4095). The addresses of the block X2 are 2d to 3d−1 (4096 to 6143). The addresses of the block X3 are 3d to 4d−1 (6144 to 8191). The addresses of the block X4 are 4d to 5d−1 (8192 to 10239).

In addition, the addresses of the block Y0 are 0 to d−1 (0 to 2047). The addresses of the block Y1 are d to 2d−1 (2048 to 4095). The addresses of the block Y2 are 2d to 3d−1 (4096 to 6143). The addresses of the block Y3 are 3d to 4d−1 (6144 to 8191).

Subsequently, simultaneously with light emission by the light emitting element 11, the AD converter 35 starts to sample a light reception signal (step S13 in FIG. 9). The controller 32 stores the same sampled data output from the AD converter 35 simultaneously sequentially from the first address of the first memory 41 and the first address of the second memory 46 (step S14 in FIG. 9). More specifically, the controller 32 stores the sampled data output from the AD converter 35 sequentially from the first address (0) of the first memory 41 to the last address (10239) of the first memory 41. The controller 32 stores the sampled data output from the AD converter 35 sequentially from the first address (0) of the second memory 46 to the last address (8191) of the second memory 46.

Subsequently, when the sampled data is stored in the second memory 46 up to the last address (8191), the entire second memory 46 is used. Further, when the sampled data is stored in the first memory 41 up to the last address (10239), all of the first memory 41 will be used. Therefore, the controller 32 determines whether the sampled data output from the AD converter 35 has been stored sequentially up to the last address of the first memory 41 and the last address of the second memory 46 (step S15 in FIG. 9).

When the sampled data has not been stored up to the last address (8191) of the second memory 46 (NO in step S15 in FIG. 9), the controller 32 continues to store the sampled data output from the AD converter 35 sequentially from the first address (0) of the second memory 46 to the last address (8191) of the second memory 46 (step S14 in FIG. 9).

Meanwhile, when the sampled data has been stored in the second memory 46 up to the last address (8191) (YES in step S15 in FIG. 9), as shown in FIG. 6, the controller 32 returns to the first address (0) of the second memory 46 and the first address (0) of the second memory 46 to the last address (8191) of the second memory 46 are sequentially overwritten with the sampled data output from the AD converter 35 (step S16 in FIG. 10). During the overwriting, the controller 32 adds the sampled data already stored in the second memory 46 and the sampled data to be newly stored in the second memory 46 and stores the addition result in the second memory 46 (step S16 in FIG. 10).

More specifically, when the sampled data is stored in the second memory 46 from the first address (0) of to the last address (8191) of the second memory 46 for the first time (storage in the "first round" shown in FIG. 6), the second selector 44 outputs "0" in response to a control signal transmitted from the controller 32. Meanwhile, when the sampled data is stored in the second memory 46 from the first address (0) to the last address (8191) of the second memory 46, and the memory is overwritten back again from the first address (0) (in the "second round" and on in FIG.

6), the second selector 44 outputs the sampled data already stored in the second memory 46 in response to a control signal transmitted from the controller 32. Therefore, in the second round and on, every time overwriting with the sampled data is performed, the sampled data to be newly stored at the address in the second memory 46 is added to the sampled data already stored at the address in the second memory 46.

During the overwriting, the controller 32 may input the sampled data output from the AD converter 35 removed of the DC component into the first adder 39 and the second adder 45 and store the value in each of the first memory 41 and the second memory 46. In this case, the value obtained by subtracting the DC component from the sampled data output from the AD converter 35 is stored in each of the first memory 41 and the second memory 46. In this way, even when the sampled data already stored in the second memory 46 and the sampled data newly stored in the second memory 46 are added and stored in the second memory 46, the second memory 46 can be prevented from becoming saturated due to the increase in the addition result.

FIG. 6 illustrates how the controller 32 performs overwriting while adding the sampled data already stored in each of the first memory 41 and the second memory 46 and the sampled data to be newly stored in each of the first memory 41 and the second memory 46. The control described above with respect to step S14 (NO in step S15 in FIG. 10) following step S15 in FIG. 10 and the control described above with respect to step S16 in FIG. 10 are similarly performed with respect to the first memory 41.

Subsequently, the controller 32 determines whether at least a time period corresponding to the maximum measurement distance has elapsed in (step S17 in FIG. 10) after the start of light emission by the light emitting element 11. When at least the time period corresponding to the maximum measurement distance has not elapsed (NO in step S17 in FIG. 10), the controller 32 continues to perform the control described above with respect to step S16 in FIG. 10.

Meanwhile, when at least the time corresponding to the maximum measurement distance has elapsed (YES in step S17 in FIG. 10), the controller 32 stops the light emission by the light emitting element 11 and the sampling of the light reception signal by the AD converter 35 and determines the combination of blocks in the first memory 41 and the second memory 46 in which the pulse data on the light reception signal is stored (step S18 in FIG. 10).

In the example shown in FIG. 6, the pulse data on the light reception signal is stored in the block X2 of the first memory 41 in the third round and stored in the block Y0 of the second memory 46 in the fourth round. Therefore, as shown in FIG. 7, the combination of blocks in the first memory 41 and the second memory 46 in which the pulse data on the light reception signal is stored is "the block X2 in the first memory 41—the block Y0 in the second memory 46." As shown in FIG. 6, the combination of blocks in the first memory 41 and the second memory 46 is only one combination during at least the time period corresponding to the maximum measurement distance after the start of the light emission by the light emitting element 11.

In the distance measuring device according to the embodiment, it is desirable that the memory size (or the address number) of the first memory 41, the memory size (or the address number) of the second memory 46, and the memory size difference (or the address number difference d) between the first memory 41 and the second memory 46 are adjusted as appropriate, so that only one combination of blocks in the first memory 41 and the second memory 46 is obtained until at least the time period corresponding to the maximum measurement distance elapses after the start of the light emission by the light emitting element 11.

Subsequently, the controller 32 controls the first address counter 42 and calculates the address in the first memory 41 in which the pulse data on the light reception signal is stored on the basis of the combination of the block in the first memory 41 and the block in the second memory 46 in which the pulse data on the light reception signal is stored (step S19 in FIG. 10). For example, in the specific example, the first address of the block X2 in the first memory 41 in the third round is $(5 \times d) \times (3-1) + (2 \times d) = 5 \times 2048 \times 2 + 2 \times 2048 = 24576$. The controller 32 may control the second address counter 47 and calculate the address in the second memory 46 at which the pulse data on the light reception signal is stored. The first address of the block Y0 in the second memory 46 in the fourth round is the same as the first address of the block X2 in the first memory 41 in the third round.

In this way, the controller 32 can specify the address in the memory at which the pulse data on the light reception signal is stored by using a plurality of memories having smaller and different memory sizes. Then, the rough distance calculator 51 calculates the rough distance to the measurement object 5 on the basis of the address at which the pulse data on the light reception signal is stored (step S19 in FIG. 10). Stated differently, the rough distance calculator 51 calculates the rough distance to the measurement object 5 on the basis of the sampled data added up at the memory address until at least the time period corresponding to the maximum measurement distance elapses. For example, the rough distance calculator 51 calculates the rough distance to the measurement object 5 by calculating the product of the address in the memory at which the pulse data on the light reception signal is stored and the sampling interval (in terms of distance).

As shown in FIG. 8, the controller 32 may divide the combination of blocks in the first memory 41 and blocks in the second memory 46 into patterns to calculate the address in the memory at which the pulse data on the light reception signal is stored (step S19 in FIG. 10).

More specifically, in the specific example in FIG. 8, the blocks in the first memory 41 and the blocks in the second memory 46 are the same in the first pattern. When the pulse data on the light reception signal is in the first pattern, the controller 32 directly uses the address in the first memory 41 or the second memory 46 and calculates the address at which the pulse data on the light reception signal is stored.

In the second pattern, the combination includes the block X4 in the first memory 41 and the block Y0 of the second memory 46. When the pulse data on the light reception signal is in the second pattern, the controller 32 uses the address in the first memory 41 and calculates the address at which the pulse data on the light reception signal is stored.

In the third pattern, the combination includes the blocks X0 to X2 in the first memory 41 and the blocks Y1 to Y3 in the second memory 46. When the pulse data on the light reception signal is in the third pattern, the controller 32 uses the address obtained by adding the address in the first memory 41 and the memory size of the first memory 41 (the number of addresses is 10240 in this example) to calculate the address at which the pulse data on the light reception signal is stored.

In the fourth pattern, the combination includes the blocks X3 to X4 in the first memory 41 and the blocks Y0 to Y1 in the second memory 46. When the pulse data on the light reception signal is in the fourth pattern, the controller 32 uses the address obtained by adding the address in the first memory 41 and the memory size of the first memory 41 (the number of addresses is 10240 in this example) to calculate the address at which the pulse data on the light reception signal is stored.

In the fifth pattern, the combination includes blocks X0 to X1 in the first memory 41 and blocks Y2 to Y3 in the second memory 46. When the pulse data on the light reception signal is present in the fifth pattern, the controller 32 uses an address obtained by adding the address in the first memory 41 and two times the memory size of the first memory 41 (the number of addresses is 10240 in the example) and calculates the address at which the pulse data on the light reception signal is stored.

In the sixth pattern, the combination includes blocks X2 to X4 in the first memory 41 and blocks Y0 to Y2 in the second memory 46. When the pulse data on the light reception signal is in the sixth pattern, the controller 32 uses an address obtained by adding the address in the first memory 41 and two times the memory size of the first memory 41 (according to the embodiment, the number of addresses: 10240) and calculates the address at which the pulse data on the light reception signal is stored.

The method for calculating the addresses shown in FIG. 8 also allows the controller 32 to specify the address in the memory at which the pulse data on the light reception signal is stored by using a plurality of memories having different smaller memory sizes. Then, the rough distance calculator 51 calculates a rough distance to the measurement object 5 on the basis of the address at which the pulse data on the light reception signal is stored (step S19 in FIG. 10).

Then, the precise distance calculator 49 calculates a precise distance equal to or less than the sampling interval using a Fourier transform (step S21 in FIG. 10).

Known calculation methods can be used in the calculation of precise distances using a Fourier transform. The precise distance calculator 49 may calculate the precise distance using a method other than a Fourier Transform.

Subsequently, the processing unit 52 calculates a distance value from the distance measuring device to the measurement object 5 by adding the rough distance value calculated by the rough distance calculator 51 and the precise distance value calculated by the precise distance calculator 49 (step S22 in FIG. 10).

In the specific example, the controller 32 stores the same sampled data simultaneously from the first address of the first memory 41 and the first address of the second memory 46 and returns to the first address to overwrite the first address with the sampled data when the sampled data is stored up to the last address of each of the first memory 41 and the second memory 46. During the overwriting, the controller 32 executes such control that the sampled data already stored in each of the memories 41 and 46 and the sampled data to be newly stored in each of the memories 41 and 46 are added. Therefore, every time overwriting with the sampled data is performed back from the first address, the sampled data to be newly stored at the addresses of each of the memories 41 and 46 is added up to the sampled data already stored at the addresses of each of the memories 41 and 46. The rough distance calculator 51 calculates a rough distance to the measurement object 5 on the basis of the sampled data added up at the addresses of each of the memories 41 and 46 until at least a time period corresponding to the maximum measurement distance has elapsed. Therefore, even when neither of the memories 41 and 46 has a memory size necessary for storing the sampled data for the maximum measurement distance, the rough distance calculator 51 can calculate a longer rough distance to the measurement object 5 with greater accuracy on the basis of the address in the memory at which the pulse data on the light reception signal is stored. This improves the measurement accuracy and the maximum measurement distance while the memory size is reduced.

The controller 32 also specifies the address in the memory at which the pulse data on the light reception signal is stored on the basis of a combination of blocks of the first memory 41 and the second memory 46 in which the pulse data on the light reception signal is stored. Therefore, when neither of memories 41 and 46 has the memory size necessary for storing the sampled data for the maximum measurement distance, the controller 32 may specify the address in the memory at which the pulse data on the light reception signal is stored. The rough distance calculator 51 then calculates the rough distance on the basis of the address in the memory at which the pulse data on the light reception signal is stored. This ensures that the measurement accuracy is improved while the memory size is reduced.

Also, when the value of the sampled data output from the AD converter 35 removed of the DC component is stored in each of the first memory 41 and the second memory 46, the first memory 41 and the second memory 46 can be prevented from being saturated due to an increase in the addition result. Therefore, the measurement accuracy can be improved while the memory size is further reduced.

Note in the description of the example, only one piece of pulse data on a light reception signal is provided, however, multiple pieces of pulse data on a light reception signal may be present. For example, pulse data on a first light reception signal may be present with respect to a measurement object 5 (e.g., a tree) located at a relatively small distance to the distance measuring device, and pulse data on a second light reception signal may be present with respect to a measurement object 5 (e.g., a cliff) located at a relatively large distance from the distance measuring device. Even when pulse data on multiple light reception signals is present, the controller 32 may specify the addresses of the memory at which the pulse data on the multiple light reception signals is stored on the basis of a combination of blocks of the first memory 41 and the second memory 46 in which the pulse data on the multiple light reception signals is stored. This will be described in detail later.

Also in this specific example, when the pulse data on the light reception signal extends over adjacent blocks in the first memory 41 and adjacent blocks in the second memory 46, the controller 32 may estimate an apparent address by using the pulse data before and after the blocks over which the pulse data on the light reception signal extends in each of the first memory 41 and the second memory 46.

Now, second and third specific examples in which the distance measuring device according to the embodiment calculates the distance to a measurement object will be described with reference to the drawings. Note that when the components of the distance measuring device in the second and third specific examples are the same as those of the distance measuring device in the first specific example described above in conjunction with FIGS. 4 to 10, their descriptions are omitted as appropriate, and the different features will be mainly described.

Figure 11:
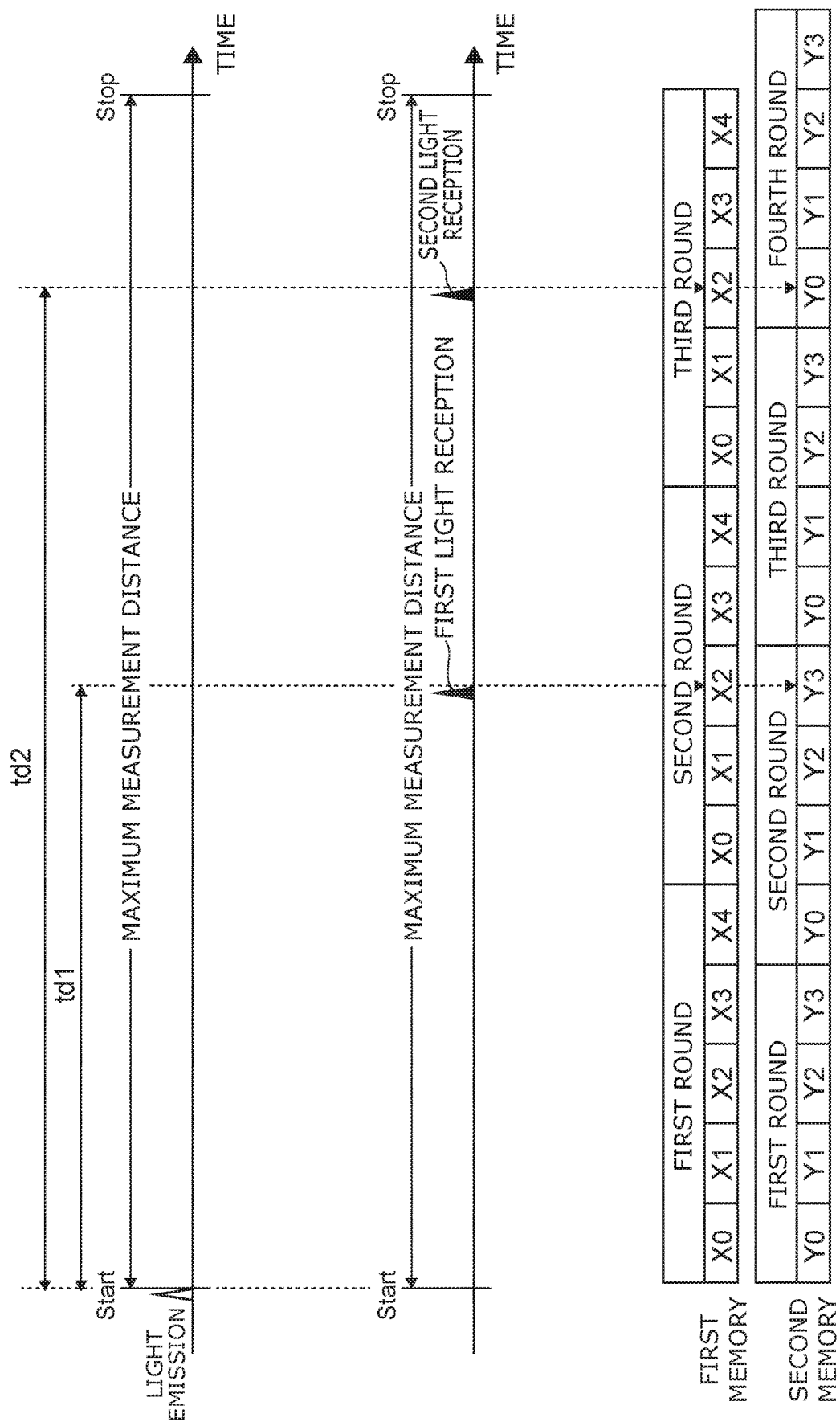
FIG. 11 schematically illustrates a relation between pulse data on a light reception signal and memory blocks.
Figure 12:
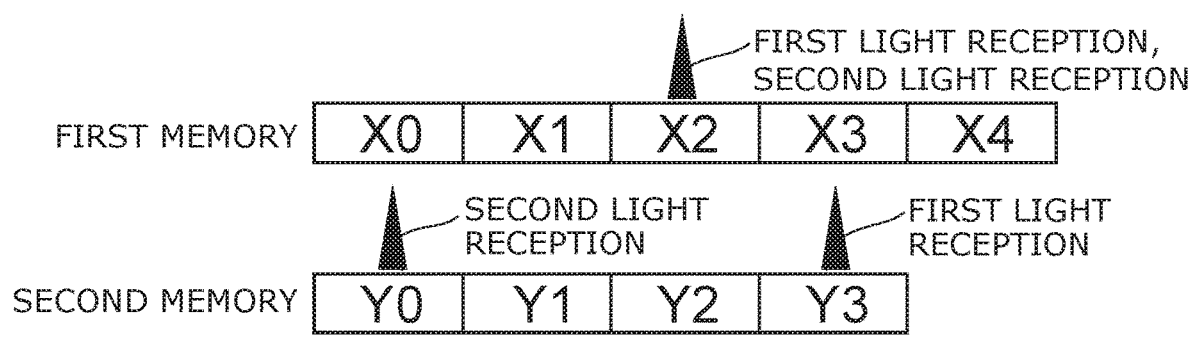
FIG. 12 is a schematic diagram for illustrating a combination of memory blocks in which pulse data on the light reception signal is stored.

FIG. 11 is a schematic diagram illustrating a relation between pulse data on a light reception signal and memory blocks. FIG. 12 is a schematic diagram illustrating a combination of memory blocks in which the pulse data on the light reception signal is stored. The upper timing chart in FIG. 11 corresponds to the upper timing chart in FIG. 3. The timing chart shown in the middle in FIG. 11 corresponds to the lower timing chart in FIG. 3. The lower timing chart in FIG. 11 schematically illustrates a combination of multiple memory blocks.

In the following description of the second specific example, multiple light reception signals are present. Specifically, as shown in FIG. 11, the case in which there are pulse data on a first light reception signal by a first measurement object and pulse data on a second light reception signal by a second measurement object will be described. A first time delay td1 is generated between the first light reception signal and the light emission signal due to the direct distance between the distance measuring device and the first measurement object. In addition, a second time delay td2 is generated between the second light reception signal and the light emission signal due to the distance between the distance measuring device and the second measurement object. The process of calculating the distance to the measurement object by the distance measuring device in this example is the same as the process in the flowchart shown in FIGS. 9 and 10.

In the example shown in FIG. 11, the pulse data on the first light reception signal is stored in the block X2 of the first memory 41 in the second round and the block Y3 of the second memory 46 in the second round. The pulse data on the second light reception signal is stored in the block X2 of the first memory 41 in the third round and in the block Y0 of the second memory 46 in the fourth round. Therefore, as shown in FIG. 12, the combination of blocks of the first memory 41 and the second memory 46 in which the pulse data on the first light reception signal is stored is "the block X2 of the first memory 41—the block Y3 of the second memory 46." The combination of blocks of the first memory 41 and the second memory 46 in which the pulse data on the second light reception signal is stored is "the block X2 of the first memory 41—the block Y0 of the second memory 46."

In this way, even when pulse data on multiple light reception signals is stored in the same block in one of the first memory 41 and the second memory 46 (the first memory 41 in this example), the presence of the pulse data on the multiple light reception signals in one of the first memory 41 and the second memory 46 (the second memory 46 in this example) may be checked. The controller 32 controls the address counter (the second address counter 47 in this example) of the memory in which the presence of the pulse data on the plurality of light reception signals is determined (the second memory 46 in this example) or the memory having a greater number of pulse data pieces on the light reception signals (the second memory 46 in this example) and calculates multiple addresses in the memory (the second memory 46 in this example) in which the pulse data on the multiple light reception signals is stored.

In this example, even when pulse data on multiple light reception signals is stored in the same block of one of the first memory 41 and the second memory 46, the controller 32 can use multiple memories having different and smaller memory sizes and can specify multiple addresses in the memory in which the pulse data on the multiple light reception signals are stored by referring to the memory (the memory having a greater number of pulse data pieces on the light reception signals) in which the presence of the pulse data on the multiple light reception signals is determined. The rough distance calculator 51 can then calculate rough distances to the first and second measurement objects on the basis of the multiple addresses in which the pulse data on the multiple light reception signals are stored.

Figure 13:
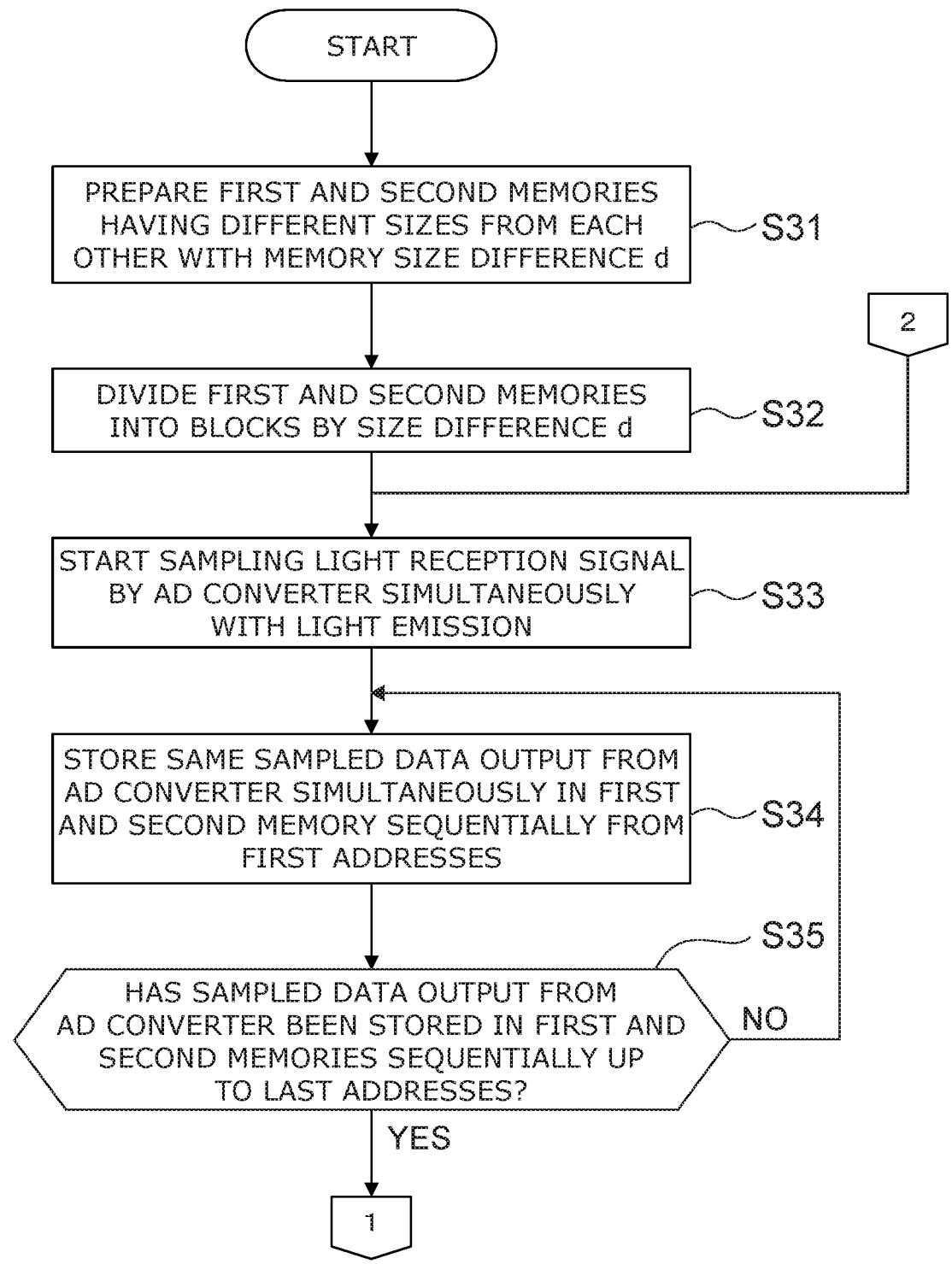
FIG. 13 is a flowchart for illustrating a third specific example of how the distance measuring device according to the embodiment calculates the distance to a measurement object.
Figure 14:
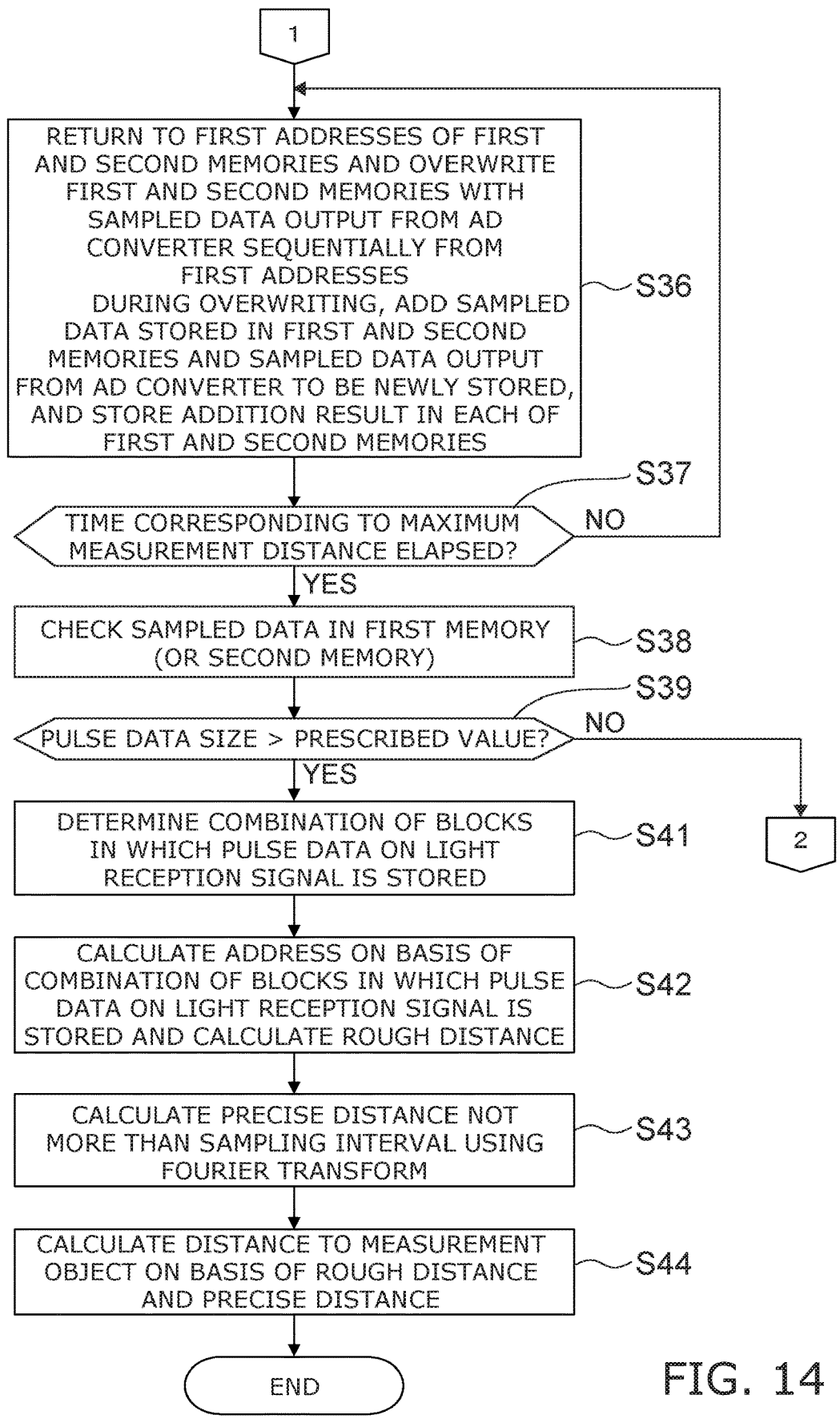
FIG. 14 is a flowchart for illustrating the third specific example of how the distance measuring device according to the embodiment calculates the distance to the measurement object.

FIGS. 13 and 14 are flowcharts for illustrating the third specific example in which the distance measuring device according to the embodiment calculates the distance to a measurement object. In the following description of the third specific example, the reflectance of the measurement object 5 is relatively low. More specifically, in this example, the SN ratio (signal-noise ratio) of the light reception signal 29 corresponding to the reflected range-finding light 28' is relatively low. For example, the measurement object 5 may have a relatively low reflectance when a long distance is measured without using a prism as a retroreflector or when the angle of incidence of the range-finding light 28 relative to the measurement object 5 is relatively small. Examples of long-distance measurement without using a prism as a retroreflector may include non-prism measurement (distance measurement without using a prism as a retroreflector) performed on a building as a measurement object 5 located about a few kilometers apart from the distance measuring device. The angle of incidence of the range-finding light 28 relative to the measurement object 5 may be relatively small for example when distance measurement is performed on a manhole lid as the measurement object 5 present about several tens of meters apart from the distance measuring device.

When the reflectance of the measurement object 5 is relatively low, the light reception signal 29 with a size (intensity) necessary for calculating the distance may not be obtained only by a single emission operation by the light emitting element 11. In order to address such distance measurement, there is an approach for adding up sampled data until the waveform of a pulse signal appears on the memory by repeating the steps of "(1) emitting light by the light emitting element 11, (2) sampling a light reception signal by the AD converter 35, and (3) storing (adding up) the sampled data." The purpose of the approach for adding up sampled data is both to make the waveform of the pulse signal appear when the SN ratio is so low that the light reception signal 29 is completely hidden in noise and to improve the SN ratio and the distance calculation accuracy when the light reception signal 29 having a size necessary for calculating the distance is not obtainable while the outer shape of the waveform of the pulse signal is available.

In the approach, it is unknown at which address on a memory the waveform of the pulse signal appears until the waveform of the pulse signal appears on the memory. Therefore, in the approach, the memory typically needs to have a memory size necessary for storing the entire sampled data for the maximum measurement distance.

In contrast, in the distance measuring device according to the embodiment, the rough distance calculator 51 can calculate a rough distance to the measurement object 5 on the basis of the address in the memory at which the pulse data on the light reception signal is stored, even when neither of the memories 41 and 46 has the memory size necessary for storing the sampled data for the maximum measurement distance.

Specifically, steps S31 to S37 shown in FIGS. 13 and 14 are identical to the control described above with respect to steps S11 to S17 in FIGS. 9 and 10. In step S38 following step S37, the controller 32 checks the sampled data stored in the first memory 41 or the second memory 46 (step S38 in FIG. 14). Subsequently, the controller 32 determines whether the size of the pulse data on the light reception signal based on the sampled data stored in the first memory 41 or the second memory 46 exceeds a prescribed value (step S39 in FIG. 14). At the time, the controller 32 checks the presence or absence of the pulse signal when the waveform of the pulse signal is made to appear as the SN ratio is so low that the light reception signal is completely hidden in noise (step S39 in FIG. 14).

When the pulse data on the light reception signal does not exceed the prescribed value (NO in step S39 in FIG. 14), the controller 32 starts sampling the light reception signal by the AD converter 35 simultaneously with light emission by the light emitting element 11 (step S33 in FIG. 13). Meanwhile, when the pulse data on the light reception signal exceeds the prescribed value (YES in step S39 in FIG. 14), the controller 32 stops the light emission by the light emitting element 11 and stops sampling the light reception signal by the AD converter 35 and determines a combination of blocks of the first memory 41 and the second memory 46 in which the pulse data on the light reception signal is stored (step S41 in FIG. 14). Steps S42 to S44 shown in FIG. 14 are the same as the control described above with respect to steps S19 to S22 in FIG. 10.

In this example, when the size of the pulse data on the light reception signal based on the sampled data stored in the first memory 41 or the second memory 46 exceeds a prescribed value, the rough distance calculator 51 calculates a rough distance to the measurement object 5 on the basis of the address at which the pulse data on the light reception signal is stored. In this way, even when the SN ratio of the light reception signal is relatively low, the measurement accuracy and the maximum measurement distance can be improved while the memory size is reduced.

The embodiment of the present invention has been described. However, the present invention is not limited to the above-described embodiment, and various modifications can be made without departing from the scope of the claims. The features of the embodiment may be partly omitted or optionally combined to differ from the above.

What is claimed is:

1. A distance measuring device which irradiates a measurement object with range-finding light as pulse light and measures a distance to the measurement object based on a time required for the pulse light to make a round trip, comprising:
   a light emitting element which emits the range-finding light as the pulse light;
   a light receiving element which receives reflected range-finding light obtained as the range-finding light is reflected on the measurement object and outputs a light reception signal corresponding to the reflected range-finding light;
   an AD converter which converts the light reception signal output from the light receiving element from an analog signal to a digital signal;
   multiple memories which have different memory sizes from one another and store sampled data output from the AD converter;
   a distance calculator which calculates the distance based on the sampled data stored in the multiple memories; and
   a controller which executes such control that the multiple memories simultaneously store the sampled data each sequentially from a first address to a last address, and then perform overwriting with the sampled data back from the first address, and during the overwriting, the sampled data already stored in the memory and the sampled data to be newly stored in the memory are added.

2. The distance measuring device of claim 1, wherein the controller divides each of the multiple memories into blocks having a prescribed size, specifies the address at which pulse data on the light reception signal is stored based on a combination of the blocks in the multiple memories in which the pulse data on the light reception signal is stored, and
   the distance calculator calculates the distance based on the address at which the pulse data on the light reception signal is stored.

3. The distance measuring device of claim 1, wherein the controller has the memory store a value obtained by subtracting a DC component from the sampled data output from the AD converter.

4. The distance measuring device of claim 1, wherein the controller has the memory store a value obtained by subtracting a DC component from the sampled data output from the AD converter.

5. The distance measuring device of claim 1, wherein the controller divides each of the multiple memories into blocks having a prescribed size, specifies the address at which pulse data on the light reception signal is stored based on a combination of the blocks in the multiple memories in which the pulse data on the light reception signal is stored, and
   the distance calculator calculates the distance based on the address at which the pulse data on the light reception signal is stored.

6. The distance measuring device of claim 2, wherein the controller has the memory store a value obtained by subtracting a DC component from the sampled data output from the AD converter.

7. The distance measuring device according to claim 1, wherein the multiple memories each have a memory size smaller than a memory size necessary for storing the sampled data for a maximum measurement distance.

* * * * *